UNITED STATES PATENT OFFICE.

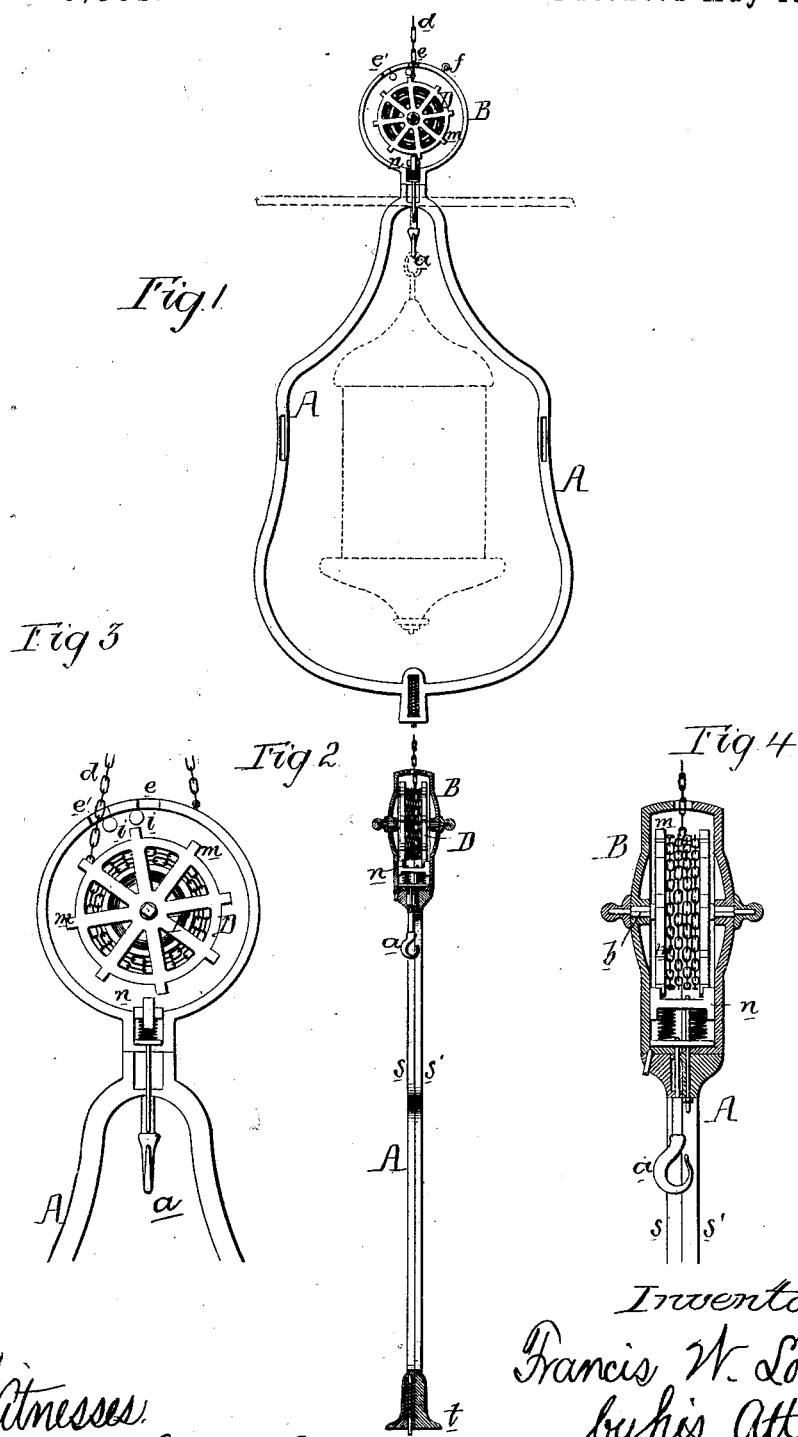

FRANCIS W. LONG, OF PHILADELPHIA, PENNSYLVANIA.

IMPROVEMENT IN BIRD-CAGE SUPPORTS.

Specification forming part of Letters Patent No. 190,881, dated May 15, 1877; application filed March 30, 1877.

*To all whom it may concern:*

Be it known that I, FRANCIS W. LONG, of Philadelphia, Pennsylvania, have invented a new and useful Improvement in Adjustable Hangers for Bird-Cages, &c., of which the following is a specification:

The object of my invention is to construct a spring-hanger for bird-cages, hanging-baskets, &c., which can be adjusted to different positions, and secured after adjustment, an object which I attain in the manner hereinafter described, reference being had to the accompanying drawing, in which—

Figure 1 is a longitudinal vertical section of my improved hanger; Fig. 2, a transverse vertical section, and Figs. 3 and 4 enlarged views of parts of the device.

A represents a frame, which may be of any desired form, and is furnished at the top with a hook, a, from which to suspend the bird-cage, hanging-basket, or other article, for the support of which the frame is intended.

Secured to, or forming part of, the upper portion of the frame is a casing, B, and across the latter extends a fixed shaft, b, on which is arranged to turn a drum or barrel, D, around which is wound a cord or chain, d.

When the ceiling of the room in which the frame A is hung is comparatively high, the chain d may pass directly through the central opening e in the top of the casing B, and be attached to a hook in the ceiling; but when the latter is low, the chain may pass through the opening e', and over a pulley hung to the ceiling, passing thence to a hook, f, on the casing, to which its end is secured.

Anti-friction rollers i, clad with rubber or other yielding material, are arranged adjacent to each of the openings e e', so as to prevent rattling of the cord or chain d as it passes through the openings.

Within the drum D is a coiled spring, F, of the ordinary character, the tendency of which is to turn the drum in the direction of the arrow, Fig. 3, and thus wind up the chain.

Each end of the drum D has on its periphery projections m, and in the lower portion of the casing B is arranged a sliding spring-bolt, n, the tendency of the spring being to force the bolt upward, so as to cause it to engage with the projections m, and prevent the turning of the drum D.

Various means may be adopted for operating the spring-bolt, so as to free the drum D, and permit the winding or unwinding of the cord or chain d, and consequent raising or lowering of the frame A; but, in order to effect this operation of the bolt, I prefer to make the frame in two parts, s and s', the latter being connected at the upper end to the bolt n, and being so acted upon by suitable springs that, although its normal condition is that shown in Figs. 1 and 2, it may, by pressing upon a lip, t, at its lower end, be depressed, as shown in Fig. 3, so as to withdraw the bolt n out of line with the projections m, and thus permit the rotation of the drum D.

By this means the locking and releasing of the drum can be effected from the lower end of the frame, which is more accessible than the upper end.

The construction of the frame A may vary—for instance, it may be in the form of a cross-piece, as shown in dotted lines in Fig. 1, or the frame may form part of the cage or other article, or, in some cases, the frame may be dispensed with, and the cage suspended directly from the casing B.

I claim as my invention—

1. The combination of a frame, bar, or case, from which the cage or other article is suspended, a cord or chain, d, a spring-drum, D, and devices for locking and releasing the said drum, all substantially as set forth.

2. The combination of the suspension-cord d, the spring-drum D, and its projections m, and the spring-bolt n, as specified.

3. The combination of the cord or chain d with the casing B, its drum D, openings e and e', and hook f, as set forth.

4. The combination of the spring-drum D and spring-locking bolt n with the frame A, made in two parts, one of which controls the movement of the bolt, as specified.

In testimony whereof I have signed my name to this specification in the presence of two subscribing witnesses.

FRANCIS W. LONG.

Witnesses:
 HERMANN MOESSNER,
 HARRY SMITH.